(12) United States Patent
Ferrari et al.

(10) Patent No.: US 9,039,854 B2
(45) Date of Patent: May 26, 2015

(54) CONNECTION OF TUBES USING THERMALLY CURABLE ADHESIVES

(75) Inventors: Andrea Ferrari, Munich (DE); Eugen Bilcai, Oberschleissheim (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 330 days.

(21) Appl. No.: 12/945,362

(22) Filed: Nov. 12, 2010

(65) Prior Publication Data

US 2011/0094656 A1   Apr. 28, 2011

Related U.S. Application Data

(63) Continuation of application No. PCT/EP2009/055693, filed on May 12, 2009.

(30) Foreign Application Priority Data

May 13, 2008  (DE) .......................... 10 2008 023 276

(51) Int. Cl.
  *C09J 5/06* (2006.01)
  *F16B 11/00* (2006.01)
  (Continued)

(52) U.S. Cl.
  CPC ............ *F16L 13/103* (2013.01); *C09J 2475/00* (2013.01); *C09J 2433/00* (2013.01);
  (Continued)

(58) Field of Classification Search
  USPC ........................................................ 156/158
  See application file for complete search history.

(56) References Cited

U.S. PATENT DOCUMENTS 3,218,305 A   11/1965   Krieble et al.
3,498,866 A *  3/1970   Kilbane ......................... 156/285
(Continued)

FOREIGN PATENT DOCUMENTS

BE   767278     10/1971
DE   1248392    8/1967
(Continued)

OTHER PUBLICATIONS

International Search Report issued for International Patent Application No. PCT/EP2009/055693 mailed on Apr. 12, 2009.
(Continued)

*Primary Examiner* — Richard Crispino
*Assistant Examiner* — Philip N Schwartz
(74) *Attorney, Agent, or Firm* — James E. Piotrowski

(57) ABSTRACT

The invention relates to a method for connecting a first tube to a second tube, the tubes being interconnected in an overlapping region by means of an adhesive that fills a gap in the overlapping region between the tubes. Said method is characterized in that: a) adhesive is applied to the overlapping region of at least one of the tubes and the adhesive is selected in such a way that it is solid at temperatures of below 30° C. after application to the overlapping region and prior to the connection of the tubes, and cannot be cured without thermal activation; b) the tube having the adhesive in the overlapping region is pushed onto or inside the other tube; c) the tubes are fixed in relation to one another in the overlapping region by a heatable clamp, said clamp being designed in such a way that it can heat the tubes in said region; d) the adhesive is thermally activated by heating the overlapping region with the aid of the heatable clamp, whereby the adhesive cures and connects the two tubes in the overlapping region; and e) the heatable clamp is removed once the adhesive has cured. The invention also relates to a method for producing a refrigerator and to a refrigerator comprising correspondingly joined tube sections.

16 Claims, 3 Drawing Sheets

Figure 1:
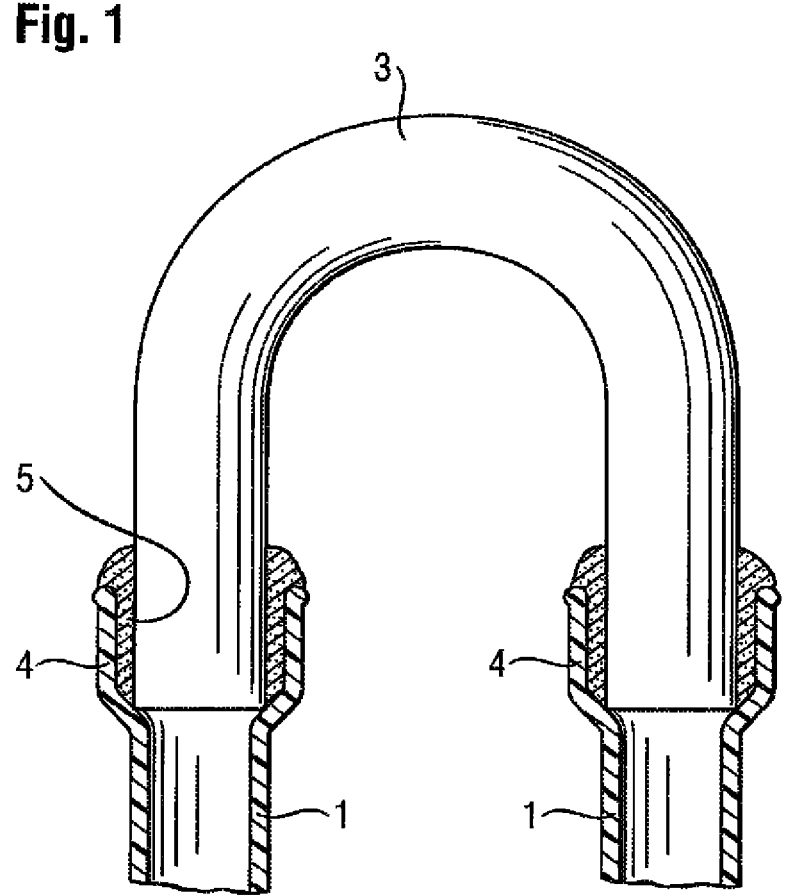

(51) Int. Cl.
*F16L 13/10* (2006.01)
*C09J 5/10* (2006.01)

(52) U.S. Cl.
CPC ......... *F16B11/008* (2013.01); *C09J 2400/166* (2013.01); *C09J 5/10* (2013.01); *C09J 2463/00* (2013.01); *F16L 13/106* (2013.01)

(56) References Cited

U.S. PATENT DOCUMENTS

| | | | |
|---|---|---|---|
| 3,565,374 A * | 2/1971 | Jones | 248/74.3 |
| 3,571,908 A * | 3/1971 | Pilia | 228/212 |
| 3,687,019 A | 8/1972 | Wolf | |
| 3,771,820 A * | 11/1973 | Hoss et al. | 285/373 |
| 3,785,025 A | 1/1974 | Wolf | |
| 3,796,783 A * | 3/1974 | Greever | 264/135 |
| 3,828,412 A * | 8/1974 | Dreksler | 29/890.035 |
| 3,937,641 A | 2/1976 | Kushner et al. | |
| 4,180,640 A | 12/1979 | Melody et al. | |
| 4,196,923 A * | 4/1980 | Zimmerli et al. | 285/286.1 |
| 4,287,330 A | 9/1981 | Rich | |
| 4,321,349 A | 3/1982 | Rich | |
| 4,359,812 A * | 11/1982 | Haag et al. | 29/458 |
| 4,416,921 A | 11/1983 | Dunn | |
| 4,583,773 A | 4/1986 | Janssen et al. | |
| 4,693,501 A | 9/1987 | Logsdon et al. | |
| 5,084,532 A | 1/1992 | Schenkel | |
| 5,372,667 A * | 12/1994 | Miyota et al. | 156/213 |
| 5,380,048 A | 1/1995 | Vogel | |
| 5,868,872 A | 2/1999 | Karmaschek et al. | |
| 5,993,581 A | 11/1999 | Toyoda et al. | |
| 6,294,597 B1 | 9/2001 | Rinde et al. | |
| 6,451,927 B1 | 9/2002 | Haas et al. | |
| 6,494,501 B2 | 12/2002 | Gotoh | |
| 6,727,320 B2 | 4/2004 | Attarwala et al. | |
| 7,041,747 B1 | 5/2006 | Attarwala et al. | |
| 7,144,956 B2 | 12/2006 | Attarwala et al. | |
| 2003/0186049 A1 * | 10/2003 | Czaplicki et al. | 428/355 EP |
| 2004/0209027 A1 * | 10/2004 | Wellman et al. | 428/36.91 |
| 2006/0142532 A1 * | 6/2006 | Wintermantel et al. | 528/59 |
| 2006/0191623 A1 | 8/2006 | Lutz et al. | |
| 2007/0090641 A1 * | 4/2007 | Jamison et al. | 285/133.3 |
| 2007/0090645 A1 * | 4/2007 | Fadini et al. | 285/364 |
| 2008/0254214 A1 * | 10/2008 | Kassa et al. | 427/207.1 |
| 2011/0094992 A1 | 4/2011 | Bilcai et al. | |

FOREIGN PATENT DOCUMENTS

| | | |
|---|---|---|
| EP | 0 001 482 | 4/1979 |
| EP | 754251 | 5/1998 |
| EP | 354498 A2 | 10/1999 |
| EP | 1785657 | 5/2007 |
| GB | 1 112 326 | 5/1968 |
| GB | 2008462 | 6/1979 |
| GB | 2090932 | 7/1982 |
| JP | 2006/138468 | 6/2006 |
| JP | 2006/194543 | 7/2006 |
| WO | WO93/00381 | 1/1993 |
| WO | WO00/37554 | 6/2000 |
| WO | WO 2004/074725 | 9/2004 |

OTHER PUBLICATIONS

International Search Report issued for International Patent Application No. PCT/US2009/000633 mailed on Sep. 14, 2009.
Just-For-Copper—The New & Reliable Way to Plumb With Copper, Jackson Industries 2004.

* cited by examiner

CONNECTION OF TUBES USING THERMALLY CURABLE ADHESIVES

This application is a continuation of International Application No. PCT/EP2009/055693, filed May 12, 2009 and published on Nov. 19, 2009 as WO 2009/138390, which claims the benefit of German Patent Application No. 10 2008 023 276.9 filed May 13, 2008, the contents of each of which are incorporated herein by reference in their entirety.

The present invention relates to a method for joining tubes with thermally curable adhesives. The method may in particular be used in the production of refrigerators, the piping for the cooling medium being joined together by the method according to the invention. The term "production" here also includes the repair of a used refrigerator with the assistance of the method steps according to the invention. At least one of the tube ends to be adhesively bonded is here coated in the overlap zone thereof with an adhesive which is solid and preferably non-tacky at room temperature and which does not cure without thermal activation. The adhesive preferably expands irreversibly on thermal activation, such that it presses the adhesively bonded tube pieces against one another. Thermal activation preferably proceeds by heatable clamps, with which the tube pieces to be joined are fixed until the adhesive cures. The tube pieces precoated with adhesive may be dispatched and stored without the adhesive layer losing its functionality.

During the production of refrigerators, pipe pieces for the cooling medium must be joined together. A conventional domestic refrigerator comprises some 6 to 8 such joints, for example at the transition from and to the compressor and from and to the heat exchanger. At present, the tubes are generally brazed together. This means that at least in each case one of the tubes to be joined must consist of copper instead of aluminum, which is less costly, since two aluminum tubes cannot be permanently brazed together. The need to use copper, which is costlier, increases the cost of the cooling medium piping system. Brazing is a method step involving skilled workmanship which requires appropriately trained personnel.

The individual tube pieces could also be adhesively bonded together in their overlap zone. In this case, however, the problem arises of how the adhesive is to be applied and cured. Nevertheless, some methods are known in the prior art for adhesively bonding tubes for cooling medium. In particular, this was proposed in connection with the production of heat exchangers for refrigerators.

One example in this respect is document JP 2006/194543, which describes a heat exchanger consisting of metallic tube pieces which are joined together by cooling fins extending perpendicularly to the tube pieces. Open ends of adjacent metal tubes are joined together by U-shaped end tubes, a liquid, heat-curable adhesive being used for this purpose. JP 2006/138468 describes a similar method specifically for joining aluminum and copper tubes.

FIG. 1 shows more precisely how the U-shaped end tubes (3) can be joined with the metal tubes (1). In this embodiment, the end pieces (4) of the metal tubes (1) are flared. The U-shaped end tube is inserted into these flared end pieces of the metal tubes (4), an adhesive (5) being introduced into the gap which arises between the flared end piece (4) and the U-shaped end tube (3). According to document GB 2008462, from which FIG. 1 is taken, this clearly takes place immediately before the two parts are joined. A thermally curable epoxy adhesive is typically used as the adhesive. In this case, the metal tubes (1) and the U-shaped end tubes (3) both consist of aluminum. In order to improve adhesive strength and anticorrosion protection, it is additionally proposed to subject the aluminum surfaces to a conversion treatment prior to application of the adhesive, in order to avoid uncontrolled oxide formation.

Applying a liquid adhesive in the manufacturing area of the heat exchangers or refrigerators generally has the disadvantage that specific application systems must be provided for this purpose. Malfunctioning of application systems may result in contamination of the working area and workpieces with adhesive. Thermal curing of the adhesively bonded heat exchanger may be achieved by placing the assembled heat exchanger in a heating oven. This cannot be applied to the complete piping system of a fully assembled refrigerator including the compressor, plastic parts etc., since damage will be caused at the temperature required for thermal curing of the adhesive.

The present invention proposes a solution to this problem.

The present invention relates in a first generalized aspect to a method for joining a first tube with a second tube, the tubes being joined together in an overlap zone using an adhesive which fills a gap in the overlap zone between the tubes, wherein:

a) the adhesive is applied onto the overlap zone of at least one of the tubes, the adhesive being selected such that, after application onto the overlap zone and before joining the tubes, it is solid at temperatures of below 30° C. and does not cure without thermal activation, b) the tube with the adhesive applied in the overlap zone is placed on the other tube or inserted therein, c) the tubes are fixed relative to one another in the overlap zone using a heatable clamp, the clamp being designed such that it is capable of heating the tubes in the overlap zone, d) the adhesive is thermally activated by heating the overlap zone with the assistance of the heatable clamp, such that it cures and joins the two tubes in the overlap zone, and, e) once the adhesive has cured, the heatable clamp is removed.

The difference relative to the above-described prior art is that the adhesive is not placed in liquid form in the overlap zone of the two tube pieces immediately before assembly of the tubes and is not liquid when these parts are joined. Instead, before the two tube pieces are joined, the adhesive is applied onto the overlap zone of at least one tube in such a form that, when said tube is placed on or inserted into the tube to be connected therewith, it is in a solid and preferably non-tacky form.

Using this method, it is possible to apply the adhesive at the place of production of the tube pieces and to dispatch and store the tube parts precoated with the adhesive. The adhesive may thus be applied centrally on the premises of the manufacturer of the tube parts and no longer has to be applied decentrally at the places of manufacture of complete refrigerators. Alternatively, however, the necessary tube pieces may also be cut to size and the adhesive applied at elevated temperature in the overlap zone at the place of manufacture of the refrigerators. On cooling to room temperature, the adhesive solidifies, such that the tube pieces provided with adhesive may be handled without the adhesive being unintentionally spread or contaminating the surroundings.

The feature that the adhesive should be "solid" should be taken to mean here that it exhibits at least such a viscosity that it does not flow under the influence of gravity and that it is not deformed during normal handling of the tube pieces, for example for packaging and dispatch or also during assembly of the piping system.

At room temperature (22° C.), the adhesive is preferably not only "solid" as defined here, but is also non-tacky. The feature of being "non-tacky" means that, when touched with a finger, the adhesive does not feel tacky and that it does not adhere to packaging material or to other precoated tube pieces. This and the previously stated feature mean that the tube pieces precoated with adhesive may either be individually packaged or be dispatched as bulk-packed products.

The adhesive must be at least spreadable for application onto the tube pieces. This may be achieved, for example, by heating an adhesive which is solid at temperatures of below of 30° C. to such an extent that it is spreadable and may be applied, for example, by being squeezed out of a nozzle. On cooling to a temperature of below 30° C., the adhesive reassumes the solid stated defined above. In the case of thermally activatable adhesives, the application temperature cannot, of course, be higher than the activation temperature. The adhesive may furthermore be applied as a spreadable paste containing water or solvent. After evaporation of the water or solvent, it changes into the desired solid state.

Curing of the adhesive is initiated by thermal activation, this being taken to mean heating to at least 50° C. The minimum temperature which is actually necessary depends on the composition of the adhesive. Below the activation temperature, the adhesive does not cure, such that it does not lose its adhesive strength during transport or storage of the precoated tube pieces.

The method according to the invention is suitable for the usual metals from which the metal tubes for the cooling medium are manufactured in the refrigerator industry. These are in particular copper or copper alloys and aluminum or aluminum alloys. The following material combinations are here possible:
a) first and second tube consist of copper or a copper alloy,
b) first and second tube consist of aluminum or an aluminum alloy,
c) one tube consists of copper or a copper alloy and the other tube consists of aluminum or an aluminum alloy.

Alternative b) is here preferred for the purposes of the present invention because, in contrast with the existing prior art, it permits the production of refrigerators with a particularly inexpensive piping system for the cooling medium.

If at least one of the tubes consists aluminum or an aluminum alloy, the latter may be subjected to a chemical surface treatment at least in the overlap zone before application of the adhesive. Details may be found in the explanations in the cited document GB 2008462. However, instead of the chromating preferably used therein, a chromium-free conversion method is preferred on environmental grounds, for example treatment of the aluminum surfaces with an acidic aqueous solution of complex fluorides of at least one of the elements B, Si, Ti, Zr. Methods as are proposed in EP 754 251 or in the prior art cited in the introduction thereof may, for example, be used for this purpose.

Figure 2:
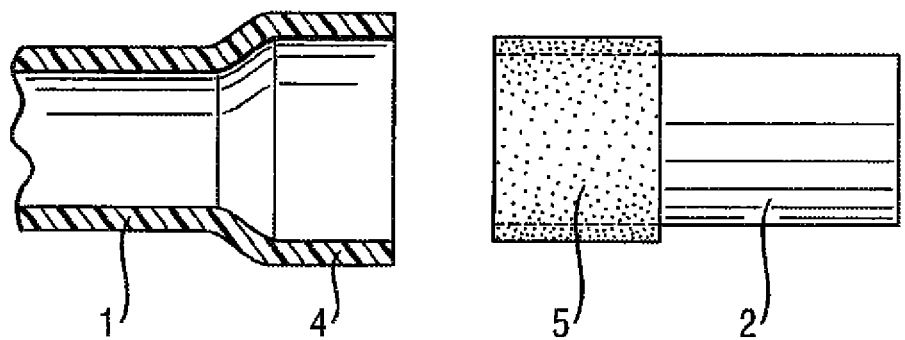
Figure 3:
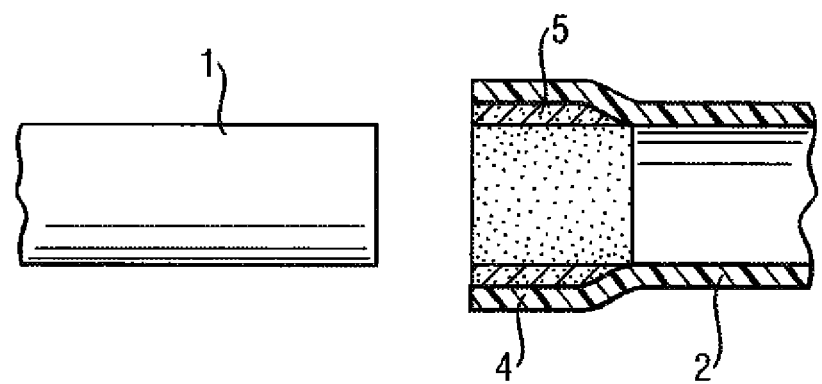

Preferably, one of the two tubes to be joined is flared in the overlap zone, such that the two tube ends may be pushed over one another in the overlap zone. This permits two different methods of applying the adhesive to the overlap zone of the two tubes. FIG. 3 shows an alternative in which the adhesive is applied onto the internal wall of the flared overlap zone of one of the two tubes and lies thereon in the manner of an internal sleeve. FIG. 2 shows an alternative embodiment. In this case, the adhesive is applied in the manner of an external sleeve onto the non-flared overlap zone of one of the two tubes, which may then, together with the adhesive layer, be inserted into the flared overlap zone of the other tube. It is obviously also possible to coat both the flared overlap zone of one tube internally and the non-flared overlap zone of the second tube externally with adhesive. This does, however, complicate processing and, at least in the case of single-component adhesives, provides no advantage. This embodiment may, however, be used in two-component adhesives if one component is applied onto the internal wall of the flared overlap zone of one tube and the second component onto the outer wall of the overlap zone of the non-flared tube. On thermal activation, the two components liquefy, mix and react together, whereby the adhesive cures.

Obviously, flaring of one of the two tube ends to be adhesively bonded in the overlap zone is unnecessary if tubes of different diameters are used which are adjusted relative to one another such that one tube can be pushed over the other. The different ways described in the preceding paragraph of coating one or both tubes with adhesive in the overlap zone then apply analogously.

FIGS. 2 and 3 show embodiments in which the overlap zone of one tube is cylindrically flared and the overlap zone of the second tube to be inserted therein is not shaped. Further embodiments are however possible. For example, the overlap zone of one tube may be conically flared and the overlap zone of the second tube may taper conically in corresponding manner.

The heatable clamp is preferably electrically heatable. A "clamp" is here taken to mean any device which may be opened and closed and, in the closed state, fixes the two tubes mechanically together at the ends to be joined. The terms "grip", "clip", "sleeve" or the like could be regarded as synonymous with "clamp" for this purpose. All that is important is that the clamp can be mounted in the zone of overlap of the tubes to be joined, is capable of fixing the two tubes together until the adhesive has cured and can then be removed again. The term "clamp" is thus below taken to mean any heatable means for coupling or joining piping.

The heatable clamp preferably comprises two semicircular clamping jaws, the curve of which is adapted to the shape and diameter of the tubes to be joined. The heatable clamp furthermore preferably comprises a resilient component such as for example a spring for holding the clamping jaws together. This component or this spring presses the clamping jaws against the tubes to be joined and fixes them mechanically, without any further external force being necessary. In order to mount and detach the clamp, the resilient component or spring is compressed or stretched such that the clamping jaws open. The resilient component could also pretension the clamping jaws such that the clamping jaws provide a snap connection and, when hooked with one another, clamp the tube parts together. The clamping jaws could furthermore themselves be constructed resiliently, such that a projecting part of one clamping jaw can latch into a recess of the second clamping jaw when the clamping jaws are swiveled towards one another.

As an alternative to holding the clamping jaws together by spring force, they could, once they have been placed on the tube, also be pressed together in another manner, for example by screwing or by applying an elastic band. This is, however, more complex than using a resilient component and therefore less preferred.

Alternatively, the tube pieces to be joined may be held together using a heatable one-part clamp connection which in the closed state firmly encircles the tube ends but may be opened along a longitudinal seam parallel to the tube pieces in opposition to its own restoring force. In order to fix the tube pieces, the clamping part is opened with application of force, placed around the tube pieces and allowed to close again due to its own restoring force. Once the adhesive has cured, the clamping part is opened again by application of force.

The heatable clamp preferably contains an electrical resistance heating element for heating purposes. This may, for example, contain or be constituted by a resistance wire. A heating resistor which consists of carbon fibers may also be used. A nonwoven or woven carbon fabric may in particular be used for this purpose. This has the advantage that the voltage to be applied is almost completely and uniformly converted into heat over the entire area. Unlike a resistance wire, local damage cannot stop the woven or nonwoven fabric from functioning since the current then flows via the other fibers.

Heating of the tubes to be joined and the adhesive layer in the overlap zone to the curing temperature takes a certain minimum period of time. In practice, this amounts to around 5 minutes. In the interest of a rapid production procedure, the adhesive is preferably selected such that, once the curing temperature has been reached, it is cured to such an extent within at most 15 minutes that the clamp may be removed. In a practical working procedure, it is therefore preferred to leave the heated clamp on the overlap zone of the tubes for a period of time in the range from 5 to 15 minutes.

The temperature which the adhesive must at least reach during curing depends on its chemical composition. It should be at least 50° C., so that the adhesive does not cure prematurely under hot ambient conditions. The adhesive preferably has a curing temperature of at least 70° C., in particular of at least 80° C. However, the temperature required for curing should not exceed a value of 150° C. and in particular 130° C., in order to prevent possible thermal damage to the tube material, to limit the energy input for heating and to enable the stated rapid working cycle of at most 15 minutes.

As has already been emphasized above, the method according to the invention may in particular be used in the production of refrigerators in order to manufacture the piping system for the cooling medium. The tubes to be connected according to the invention therefore preferably comprise tubes for conveying the cooling medium of a refrigerator. A "refrigerator" should here be taken to mean any device which comprises an interior to be cooled, the heat being removed from the interior of the refrigerator by the cooling medium via a heat exchanger and, outside the refrigerator, released into the surrounding environment via a further heat exchanger. As is known, the temperature gradient between the cooling medium in the heat exchangers inside and outside the refrigerator is produced by a compressor in conjunction with an evaporator. For the purposes of the present invention, the term "refrigerator" thus also includes devices such as for example chest freezers, upright freezers and the like.

In a preferred embodiment, an adhesive is used whose volume increases on or after thermal activation by at least 0.5%, preferably by at least 1%, but preferably by at most up to 50%, in particular by at most up to 25%. This should be taken to mean that, in addition to the normal and reversible thermal expansion which occurs in accordance with its coefficient of thermal expansion, the adhesive undergoes an irreversible increase in its volume in comparison with the starting volume at room temperature (22° C.) on heating to the activation temperature such that, after cooling back down to room temperature, it is 0.5 to 50%, preferably 1 to 25% larger than before. The stated degree of expansion thus relates to the volume of the adhesive at room temperature before and after transient heating to the activation temperature.

To this end, the adhesive preferably contains a physically or chemically acting blowing agent which is itself activated on activation of the adhesive and increases the volume of the adhesive by formation or expansion of gas. In physically acting blowing agents, the increase in volume is a physical consequence of heating hollow microspheres filled with gas or vaporizable liquid. In chemical blowing agents, a chemical reaction eliminates a gas which brings about the increase in volume of the adhesive.

Due to the increase in volume after activation, it is unnecessary for the tube precoated with adhesive in the overlap zone to fit exactly and/or be inserted into or placed over the other tube with application of force. Instead, an air gap may remain between the adhesive and wall of the other tube, so facilitating fitting together of the two tube parts. Thanks to the increase in volume, the adhesive fills this air gap after activation and in this manner thus joins the two tube parts frictionally.

Suitable blowing agents are known in the prior art, for example "chemical blowing agents" which liberate gases by decomposition or "physical blowing agents", i.e. expanding hollow spheres. Examples of the first-stated blowing agents are azobisisobutyronitrile, azodicarbonamide, dinitrosopentamethylenetetramine, 4,4'-oxybis(benzenesulfonic acid hydrazide), diphenylsulfone-3,3'-disulfohydrazide, benzene-1,3-disulfohydrazide, p-toluenesulfonyl semicarbazide. Expandable hollow plastics microspheres based on polyvinylidene chloride copolymers or acrylonitrile/(meth)acrylate copolymers are, however, particularly preferred. These are commercially available, for example, under the name "Dualite" or "Expancel" from Pierce & Stevens or Casco Nobel.

In the above-described embodiment of using an adhesive which expands after activation, it is unnecessary for the adhesive to liquefy during or after activation in order completely to fill the adhesive joint between the two tubes. In an alternative embodiment, however, it is possible to dispense with the use of a blowing agent and to use an adhesive which, during the activation step, is first (i.e. before setting) melted or liquefied without any increase in volume which extends beyond the normal thermal expansion taking place. The adhesive is thus still solid during assembly. Melting or liquefaction after the parts to be joined are fitted together leads to the adhesive bridging the adhesive joint by capillary forces. It then cures in this state, such that a frictional joint is created between the two tubes. Melting or liquefaction occurs as the result of heat input with the assistance of the heated clamp. This method is preferred if a two-component adhesive is used, one component of which is applied to the internal wall of one tube and the second component of which is applied to the outer wall of the second tube. However, in this case too, at least one of the two components may contain a blowing agent, such that it expands on heating to the activation temperature.

The method according to the invention may be performed using an adhesive based on polyurethanes, epoxy resins or acrylates, the term "acrylate" including substituted acrylates such as methacrylate.

Examples of adhesives which may be used for the purposes of the present invention are so "reactive hot-melt adhesives". These are spreadable in the molten state, such that they may be placed in this state on the tubes in the overlap zone, without the curing mechanism being activated. The latter instead entails heating to a higher activation temperature, at which a latent curing agent for a reactive binder component (for example a prepolymer with epoxy or isocyanate groups) is activated.

An example of a suitable reactive hot-melt adhesive is that which is described in greater detail in EP 354 498 A2. Said adhesive contains a resin component, at least one thermally activatable latent curing agent for the resin component and optionally accelerators, fillers, thixotropic auxiliaries and further conventional additives, the resin component being obtainable by reacting an epoxy resin solid at room temperature, an epoxy resin liquid at room temperature and a linear polyoxypropylene with amino end groups. The epoxy resins are used in a quantity such that, relative to the polyoxypropylene with amino end groups, an excess of epoxy groups, relative to the amino groups, is ensured. Dicyandiamide is for example suitable as latent curing agent. Reference is made to the stated document for further details. More specific embodiments of such a reactive hot-melt adhesive are disclosed in WO 93/00381. These too are suitable for the purposes of the present invention.

Epoxy resin structural adhesives, as are described in greater detail for example in WO 00/37554, may also be used. These comprise compositions which contain a) a copolymer with at least a glass transition temperature of −30° C. or below and groups reactive towards epoxides or a reaction product of this copolymer with a polyepoxide, b) a reaction product of a polyurethane prepolymer and a polyphenol or aminophenol and c) at least one epoxy resin. In order to make these compositions heat-curable, they additionally contain a latent curing agent from the group dicyandiamide, guanamines, guanidines, aminoguanidines, solid aromatic diamines and/or curing accelerators. They may additionally contain plasticizers, reactive diluents, rheological auxiliaries, fillers, wetting agents and/or antioxidants and/or stabilizers. Reference is made to the stated document for further details and specific examples.

Epoxy-based heat-curable hot-melt adhesives with the following composition may furthermore be used for the method according to the invention (quantities stated in parts by weight):

| Raw material | Input quantity (parts by weight) |
| --- | --- |
| Epoxy resin | 450 |
| Mineral fillers (silicates and carbonates) | 360 |
| Nitrile polymer rubber | 100 |
| Curing agent/accelerator (dicyandiamide, epoxy resin/amine adduct) | 30 |
| Acrylate-based expandable hollow microspheres | 25 |

The thermally activatable adhesive systems stated above by way of example may be formulated with or without the blowing agents described further above, depending on whether or not an increase in volume of the adhesive is desired on or after thermal activation.

A further aspect of the present invention relates to a method for producing a refrigerator which comprises tubes for conveying a cooling medium, these tubes being joined together at least in part using the above-described method according to the invention. In connection with the method according to the invention, the intended meaning of the term "refrigerator" has already been explained further above.

The present invention furthermore relates to a refrigerator which comprises tubes for conveying a cooling medium which consist solely of aluminum or an aluminum alloy and which have been joined together using the above-described method according to the invention. The explanations given further above with regard to the interpretation of the term "refrigerator" again apply. The peculiar feature of this refrigerator is that the tubes for conveying the cooling medium consist solely of aluminum or an aluminum alloy and that it is possible to dispense with the use of more costly copper tubes.

The above-described invention thus in particular enables more efficient production of refrigerators and additionally makes it possible solely to use inexpensive aluminum as the material for the piping.

Captions to the figures

FIG. 1: Example of joining two heat exchanger tubes (1) by a curved end tube (3). The heat exchanger tubes are flared in the overlap zone (4) with the end tube. The resultant gap is filled by an adhesive (5).

FIG. 2: An embodiment of the present invention in which a first tube (1) is flared in the overlap zone (4). The second tube (2) is coated externally in the manner of a sleeve with the adhesive at the end which is to be pushed into the overlap zone of the first tube.

FIG. 3: Representation of an alternative embodiment of the present invention. In this case, the first tube (1) is not flared in the overlap zone. Instead, the second tube (2) is flared in its overlap zone (4), the overlap zone being coated internally with a ring of the adhesive (5).

The invention claimed is:

1. A method for joining a first tube with a second tube, the tubes being joined together in an overlap zone using an adhesive which fills a gap in the overlap zone between the tubes, comprising:
   providing a first tube with an overlap zone adjacent one end, the first tube inner surface in the overlap zone being cylindrical,
   providing a second tube with an overlap zone adjacent one end, the second tube outer surface in the overlap zone being cylindrical,
   the adhesive is applied onto the overlap zone of at least one of the tubes, the adhesive being selected such that, after application onto the overlap zone and before joining the tubes, it is solid at temperatures of below 30° C. and does not cure without thermal activation and the adhesive volume increases irreversibly by at least 0.5% on thermal activation,
   the tube with the adhesive applied in the overlap zone is placed on the other tube or inserted therein,
   the tubes are fixed relative to one another in the overlap zone using a heatable clamp, the clamp being designed such that it is capable of heating the tubes in the overlap zone,
   the adhesive is thermally activated by heating the overlap zone with the assistance of the heatable clamp, such that it cures and joins the two tubes in the overlap zone, and, once the adhesive has cured, the heatable clamp is removed,
   wherein an inner surface of the first tube is bonded to an outer surface of the second tube by the cured adhesive, an outer surface of the first tube forms an exterior surface of the joined overlap zone and an inner surface of the second tube forms an interior surface of the overlap zone.

2. The method according to claim 1, wherein the material of the first and of the second tube corresponds to one of the following combinations:
   2a) first and second tube consist of copper or a copper alloy,
   2b) first and second tube consist of aluminum or an aluminum alloy,
   2c) one tube consists of copper or a copper alloy and the other tube consists of aluminum or an aluminum alloy.

3. The method according to claim 2, wherein at least one tube consists of aluminum or an aluminum alloy and, prior to application of the adhesive, said tube is subjected to a chemical surface treatment at least in the overlap zone.

4. The method according claim 1, wherein the heatable clamp is electrically heatable.

5. The method according to claim 1, wherein the heatable clamp comprises two semicircular clamping jaws and a resilient component for holding the clamping jaws together.

6. The method according to claim 1, wherein the heated clamp is left on the overlap zone of the tubes for a period ranging from 5 to 15 minutes.

7. The method according to claim 1, wherein the tubes are tubes for conveying the cooling medium of a refrigerator.

8. The method according to claim 1, wherein a polyurethane resin adhesive, epoxy resin adhesive or acrylate adhesive is used.

9. A method for producing a refrigerator comprising tubes for conveying a cooling medium, wherein the tubes for conveying the cooling medium are joined together using a method according to claim 1.

10. The method according to claim 1, wherein the adhesive is applied at the place of production of the tube pieces and the tube parts precoated with the adhesive are dispatched or placed in storage.

11. A method for preparing a fluidly sealed joint in a fluid piping system, comprising:
providing a first metal pipe including a first pipe end having an exterior surface, a first inside diameter, a first outside diameter and a cylindrical interior surface defining an overlap zone extending inwardly from the end;
providing a second metal pipe including a second pipe end having an interior surface, a second inside diameter, a second outside diameter smaller than the first inside diameter and a cylindrical exterior surface defining an overlap zone extending inwardly from the end;
applying adhesive onto the overlap zone of at least one tubular member, the adhesive being selected such that, after application onto the overlap zone and before joining the tubes, it is solid at temperatures below 30° C. and does not cure without thermal activation and the adhesive volume increases irreversibly by at least 0.5% on thermal activation;
disposing the second pipe overlap zone within the first pipe overlap zone so that the adhesive is between the first pipe interior surface and the second pipe exterior surface;
heating the adhesive in the overlap zone to activate the adhesive and bond the first pipe interior surface to the second pipe exterior surface, wherein the first pipe exterior surface is the exterior surface of the sealed joint and the second pipe interior surface is the interior surface of the sealed joint.

12. The method of claim 11 wherein the step of heating the adhesive comprises disposing a heatable clamp around the overlap zone and heating the adhesive between the first pipe interior surface and the second pipe exterior surface.

13. The method of claim 11 wherein the sealed joint consists of the second pipe overlap zone within the first pipe overlap zone and cured adhesive bonding the first pipe interior surface and the second pipe exterior surface in the overlap zone.

14. The method of claim 11 further comprising the step of allowing the applied adhesive to solidify before disposing the second pipe overlap zone within the first pipe overlap zone.

15. The method of claim 11 wherein the adhesive is a polyurethane resin adhesive or acrylate adhesive.

16. The method of claim 11 wherein the adhesive is a reactive, hot melt adhesive.

\* \* \* \* \*